United States Patent [19]

Schoeneberger et al.

[11] Patent Number: 4,575,755
[45] Date of Patent: Mar. 11, 1986

[54] VIDEO ENCODER/DECODER SYSTEM

[75] Inventors: Carl F. Schoeneberger; Allan B. Bundens, both of Carrollton; Richard A. Blake, Garland; Richard M. Fogle, Bedford, all of Tex.

[73] Assignee: Tocom, Inc., Irving, Tex.

[21] Appl. No.: 449,985

[22] Filed: Dec. 14, 1982

[51] Int. Cl.⁴ ............................................. H04N 7/167
[52] U.S. Cl. ...................... 358/120; 358/118; 358/124
[58] Field of Search .................. 358/120, 124, 118

[56] References Cited

U.S. PATENT DOCUMENTS

| | | | |
|---|---|---|---|
| 3,808,732 | 4/1974 | Reeves | 358/124 |
| 4,075,660 | 2/1978 | Horowitz | 358/120 |
| 4,222,068 | 9/1980 | Thompson | 358/124 |
| 4,257,065 | 3/1981 | Papay | 358/124 |
| 4,463,376 | 7/1984 | Osaka et al. | 358/120 |
| 4,467,353 | 8/1984 | Citta et al. | 358/120 |
| 4,527,195 | 7/1985 | Cheung | 358/120 |
| 4,533,949 | 8/1985 | Fujimura et al. | 358/119 |

Primary Examiner—S. C. Buczinski
Attorney, Agent, or Firm—Hopgood, Calimafde, Kalil, Blaustein & Judlowe

[57] ABSTRACT

An apparatus and method for encoding and decoding a television signal are disclosed in which the horizontal sync pulses and the first section of the video signal are inverted, and the inverted horizontal sync pulses and video signals are reduced in amplitude by a predetermined amount.

53 Claims, 16 Drawing Figures

VIDEO ENCODER/DECODER SYSTEM

BACKGROUND OF THE INVENTION

The present invention concerns a video signal encoder and decoder system. More particularly, the present invention relates to apparatus and methods for encoding and decoding a television signal so as to prevent others from having unauthorized access to the signal.

In present-day pay television systems, it is often necessary to encode or "scramble" a transmitted video signal to control access to the signal by the consuming public. A variety of types of encoding are employed, all utilizing the concept of rendering the video signal unviewable to a normal television receiver without having proper decoding apparatus. In subscription television systems, an encoder/decoder system is essential to prevent unauthorized reception of the signals which are transmitted by radio frequency. Even in systems which are generally "closed" to the public, for example, coaxial cable systems, it has become increasingly important to scramble the signals at the transmitter or "headend" of the system. Although access to the video signals on cable systems is substantially limited by the very nature of the transmission via coaxial cable, it is necessary to control the continuation of services and access to certain levels of programming for subscribers as part of an on-going cable service.

It is not uncommon for a typical cable television system to provide signals on fifty-five or more channels, in contrast to a subscription television system which may transmit only one or two television channels. Cable systems, therefore, require encoder/decoder systems having apparatus capable of processing many channels without being inordinately expensive. Encoder/decoder apparatus for cable systems should utilize scrambling and descrambling components which do not require a high degree of accuracy or have precise timing requirements which would substantially increase the cost of the components. Moreover, it is preferable to minimize or eliminate any additional transmission of control signals or other additional data which would be required to decode the scrambled signal.

In some encoding systems, an approach is used of randomly scrambling the video data information and/or the synchronizing pulses of the video signal. Such a system invariably requires the transmission of additional control data or signals to provide the necessary information for a decoder unit to unscramble the video signal at the receiver. The transmission of such additional data is both inefficient and requires detection components in the decoder to change the video signal back to its proper format.

Other scrambling systems suppress certain signals, particularly the horizontal synchronization pulses of the video signal so that they cannot be recognized by a television receiver without proper decoding equipment. However, some television receivers today are sufficiently sophisticated to be able to lock onto a video signal even with the horizontal synchronization pulses suppressed to at least provide a black and white picture for the viewer. In some cases, the receivers can even detect some color from such scrambled signals although the color might be altered.

Thus, it has become important, particularly for a cable television system to have encoding and decoding units having relatively inexpensive and simple components requiring little if any transmission of control signals to decode the video signal. It is also desirable to have a scrambling system which thoroughly encodes the signal so that it cannot be even partially decoded without authorized circuitry.

SUMMARY OF THE INVENTION

To overcome the foregoing difficulties and achieve the desired results, and in accordance with the present invention and its preferred embodiments as described herein, encoder and decoder apparatus and methods are provided for controlling access to video signals transmitted by coaxial cable or otherwise. Said system utilizes an approach of inverting the video data and the horizontal sync pulses in selected fields of the video signal, and also reducing the amplitude of the inverted video data and inverted horizontal sync pulses. In the present invention, at least a portion of the vertical interval is not inverted so as to provide a reference for the detection circuitry. In one preferred embodiment, at least a portion of the vertical sync pulse as well as a plurality of horizontal sync pulses in the vertical interval are not inverted and are used to provide the necessary control signals to the decoder units to unscramble the video signal. It is also preferred that the inverted and reduced portion of the video signal is raised relative to the non-inverted portion to lower the power requirements at the horizontal sync level of the video signal.

In one aspect of the present invention, a video encoding method and system are provided for processing a video signal having alternate video portions and vertical interval portions. Each video portion includes video data and horizontal sync pulses, and each vertical interval portion includes a vertical sync pulse, vertical interval data, and horizontal sync pulses. The initial video signal is processed by inverting a plurality of the horizontal sync pulses in a first section of the video signal, the first section including at least a part of the video portion and excluding at least part of the vertical interval portion. The amplitude of each of the inverted horizontal sync pulses in the first section of the video signal is also reduced. Alternate portions of said first and second sections of the video signal are combined to provide a scrambled video signal.

In another aspect of the present invention, a video encoding method and system are provided for processing a normalized video signal having periodic video fields, each field having a DC voltage reference level. A portion of each of the video signal is inverted and reduced in amplitude relative to the noninverted portion. The DC voltage reference levels of the inverted and noninverted portions are determined. The inverted portion is shifted relative to the noninverted portion so that the DC reference level of the inverted portion is offset by a predetermined amount from the DC reference level of the noninverted portion of the video signal.

With respect to another aspect of the present invention, a video decoding method and system are provided for processing a scrambled video signal having alternate first encoded sections of the video signal and second uncoded sections of the video signal. Each encoded section of the video signal includes inverted video data and horizontal sync pulses having reduced amplitudes relative to the the uncoded video signal in the second section. The video decoder system inverts the encoded section of the scrambled video signal and increases the amplitude of the inverted section to a level corresponding to the amplitude of the uncoded video section of the scrambled video signal. The inverted and non-inverted portions are alternately combined to provide an unscrambled signal. The sync pulses of the scrambled video signal are detected to control the combining of the inverted and noninverted portions of the video signal.

Still another aspect of the present invention involves a video decoding method and system for processing a normalized scrambled video signal having periodic video fields. Each field of the signal has an inverted portion and a noninverted portion with an amplitude greater than the inverted portion. Both inverted and noninverted portions have a DC voltage reference level. The inverted portion of the scrambled video signal is inverted to generate a re-inverted portion. That re-inverted portion is increased in amplitude to correspond to the amplitude of the noninverted portion of the scrambled video signal. The DC voltage reference levels of the reinverted portion and the noninverted portion are determined. The reinverted portion is shifted relative to the noninverted portion by a predetermined amount so that the DC reference levels of the reinverted portion and the noninverted portion are substantially aligned.

As can be seen from the foregoing, the present invention provides a number of advantages over the prior art. The system and methods of the present invention provide a means of thoroughly and effectively scrambling the outgoing video signal so that it cannot be utilized by unauthorized receivers. Yet, the present invention comprises a relatively simple circuit when does not require elements having a high degree of precision or accuracy. Moreover, the present invention does not require the transmission of additional coded data or information or control of the decoder circuitry. Also, the adjusted level of the scrambled signal minimizes the power requirement of the encoder and decoder circuitry.

Additional objects and advantages of the present invention will be apparent from the following description of the preferred embodiments and from the combinations described in the following claims.

DETAILED DESCRIPTION OF THE PREFERRED EMBODIMENT

Referring now to the figures, a detailed description is given of preferred embodiments of the invention as illustrated in the accompanying drawings.

Figure 1A:
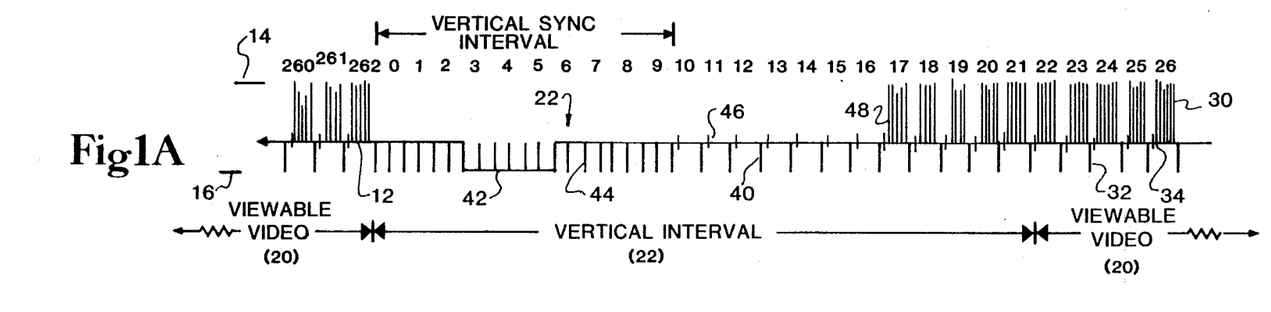
FIG. 1A is an illustration of a portion of a video signal including a vertical interval section and a video data section.

The invention is concerned with a system and method of encoding and decoding a video signal. Preferably, the video signal has a format similar to that shown in FIG. 1A. The picture on a conventional television screen is composed of two fields, each containing 262.5 lines interlaced with the lines of the other field. Each line is made by an electron beam which sweeps across the screen in response to electronic data in the video signal corresponding to that line. FIG. 1A depicts a standard format for a video signal 10, which is a combination of analog and digital signals as shown. The digital portions of the signal vary between two levels. The first level 12 is usually at or near a line of zero amplitude (based on I.R.E. units) and is referred to as the black level. In the preferred embodiment black level is set at 7.5 I.R.E. units, and the zero level is referred to as the blanking level as will be shown and discussed with respect to FIG. 2A. A second level is established a fixed distance (preferably 100 I.R.E. units) above the zero level and is referred to as the data white level 14. A sync pulse level 16 is also established at a fixed negative distance (preferably 40 I.R.E. units) below the zero level. The term "sync" is a shorthand term meaning "synchronizing."

The composite video signal 10 is composed of two portions: a viewable video data portion 20 which is only partially shown in FIG. 1A and a vertical interval portion 22 which is approximately centrally located in FIG. 1A. In the viewable video data portion, a series of analog data signals 30 each represent one of the lines of the television screen and are identified by the line number as indicated above each data signal. The viewable video portion also includes a plurality of horizontal sync pulses 32 each of which is positioned between two data signals 30 and extends in a negative direction from the black level 12 to the sync pulse level 16. The video portion also includes a plurality of color burst signals 34 each one following a horizontal sync pulse 32 and immediately preceding a data line signal 30.

The vertical interval portion 22 of video signal 10 is composed of the video signal segment from data line 262.5 to data line 21. Line 262.5 is also referred to herein and shown in FIGS. 1A and 1B as line 0. Included therein are a plurality of horizontal sync pulses 40 identical to sync pulses 32 in the video portion, a vertical sync pulse 42 and a plurality of horizontal sync pulses in the vertical sync interval, called equalizing pulses 44. Vertical interval pulse 42 occurs during lines 0 to 9 as a change in the video signal level from black level 12 to zero level at line 0, to the horizontal sync pulse level 16 at line 3, then back to the zero level at line 6 and finally back to black level at line 9. During this transition, negative equalizing pulses 44 are generated having a black level amplitude and a frequency rate twice as fast as the rate of horizontal sync pulses 32 and 40.

Vertical interval 22 also includes color burst signals 46 immediately after each horizontal sync pulse 40, similar to color burst signals 34 in the video portion of the video signal. During lines 10 to 16 there are normally no data signals. Finally, lines 17-21 of vertical interval 22 include data signals 48 which provide control and video reference signals and text data to be used in connection with the video data in the viewable video portion.

Figure 1B:
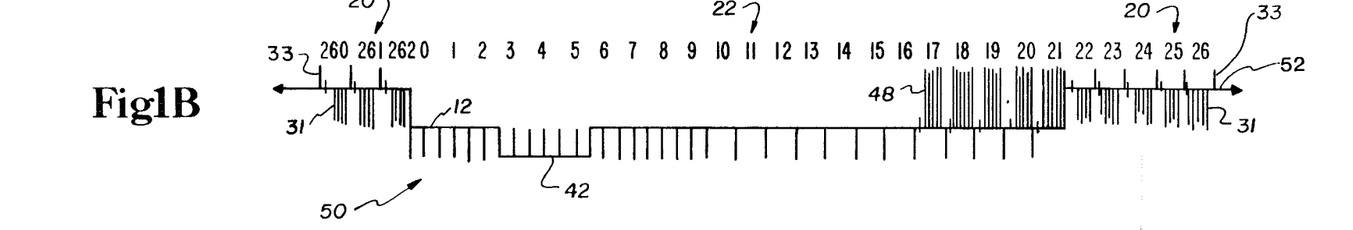
FIG. 1B is an illustration of the portion of the video signal of FIG. 1A showing a preferred modification of the signal in accordance with the present invention.
Figure 1C:
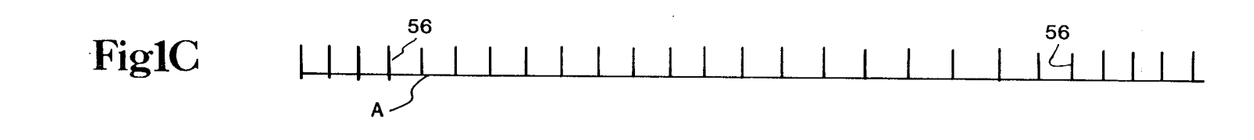
FIGS. 1C and 1D represent timing signals used in the operation of the system in accordance with the present invention.

Looking now at FIG. 1B,, a scrambled video waveform 50 is shown which has been encoded or scrambled in accordance with a preferred embodiment of the present invention. The video signal 50 still includes the same two portions, namely viewable video portion 20 and vertical interval portion 22. As before, vertical interval portion 22 includes lines 0 to 21 and viewable video portion 20 includes lines 22 to 262. No changes have been made in the vertical interval portion 22 of the video signal, and the pulses therein are centered on the black line level 12 and extend in the same direction with the same amplitudes as in the uncoded signals of FIG. 1A.

In the video portion 20, the video data signal 30 and horizontal sync pulses 32 have been inverted to form inverted video data signals 31 and inverted horizontal sync pulses 33. The inverted video data signals 31 extend downward in a negative direction and the inverted horizontal sync pulses 33 extend upward in a positive direction. Moreover, the black level 12 for signals 31 and pulses 33 has been shifted in a positive direction to a new level 52 between the black level 12 and white level 14, preferably at about 72 I.R.E. Finally, the amplitudes of the pulses and signals in the video portion have been reduced by approximately 30 percent so that the combined amplitude of the video data signals 31 and horizontal sync pulses 33 is on a parity with the total amplitude of the vertical interval video data pulses 48.

The resulting scrambled video signal 50 simply and effectively makes the video data therein inaccessible to a television receiver which does not have an appropriate decoder circuitry. Since the horizontal sync pulse 33 have been inverted, the automatic gain control of a television receiver without a decodeer cannot locate the sync pulses in order to lock in the picture. Moreover, the reduced amplitude of the viewable video section 20 of the scrambled video signal 50 causes an unauthorized television receiver to automatically increase its gain so that the vertical interval sync signal 42 is substantially increased in amplitude and thus overloads the receiver circuit and is not recognizable as a vertical interval sync pulse signal. Thus, an unauthorized television receiver cannot lock on either the horizontal or vertical sync pulses and effectively loses all control of the video data. By shifting the zero level of the inverted and reduced scrambled signal to align with the data signals of the unscrambled signal, the power requirements of the system are minimized.

Figure 2A:
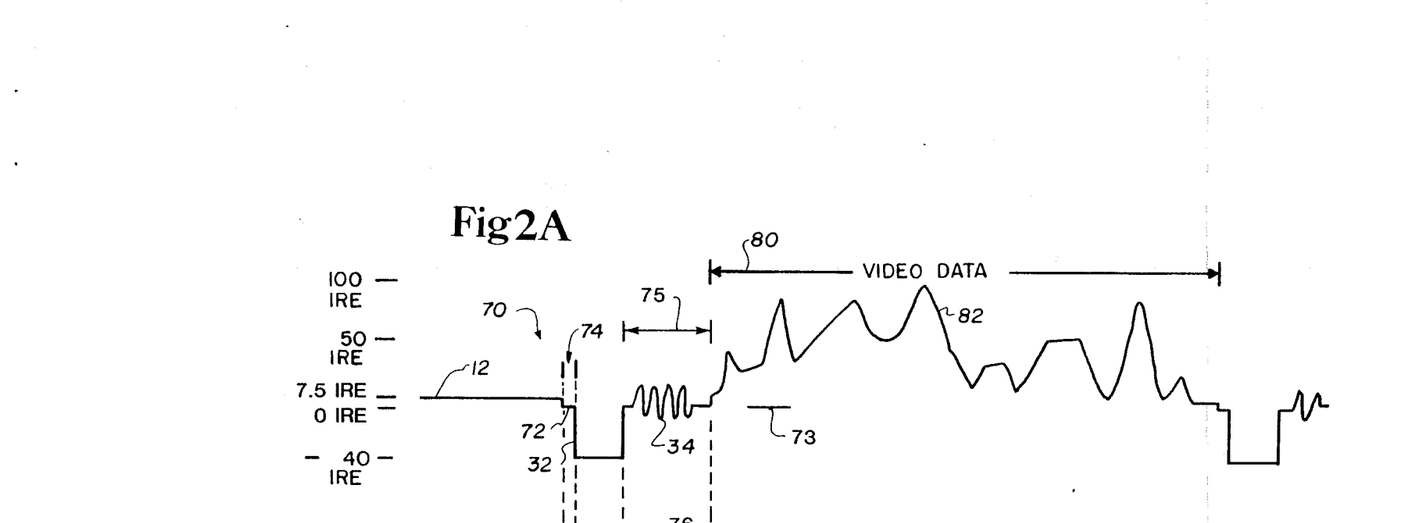
FIG. 2A is an enlarged illustration of the waveform video line signal shown in FIG. 1A.

Turning now to FIG. 2A, an expanded portion of the video signal 10 of FIG. 1A is shown in greater detail. The waveform 70 corresponds to one complete cycle or video line of video signal 10. Corresponding reference characters are used where appropriate. The waveform begins with black level line 12 at 7.5 I.R.E. which transitions to a negative horizontal sync pulse 32 followed by a color burst signal 34. Immediately preceding horizontal sync pulse 32 there is a small negative step or shoulder 72 wherein the video signal drops to a blanking level 73 which is slightly below the black level, sufficient to turn off the electron gun of the receiver cathode ray tube (not shown) prior to the horizontal sync pulse which sweeps the gun across the screen to the next line. This blanking level 73 is set at zero I.R.E. as the standard level used for aligning the various video signals of the circuitry of the present invention, as will be shown in detail later. The time window 74 during which shoulder 72 occurs is referred to as the "front porch" time window.

Horizontal sync pulse 32 also ends at the blanking level 73 which is the reference level for color burst 34. The time window 75 irom the end of sync pulse 32 to the beginning of video signal 82 is referred to herein as the "back porch" time window. Preferably, the back porch window 75 is about 5 microseconds and the total time period for the blanking shoulder 72, horizontal sync pulse 32, and color burst signal 34 is about 11.1 microseconds. At the end of back porch window 75 the video signal returns to the black level 12 at 7.5 I.R.E.

The remaining part of waveform 70 comprises the video information portion 80 of the video line. If the line in question is any of lines 17 to 262.5, information of some sort occurs as an analog trace signal 82, an example of which is shown in FIGS. 2A. This trace signal traverses between 100 I.R.E. units (white) and 7.5 I.R.E. units (black).

Figures 3, 3A, 3B:
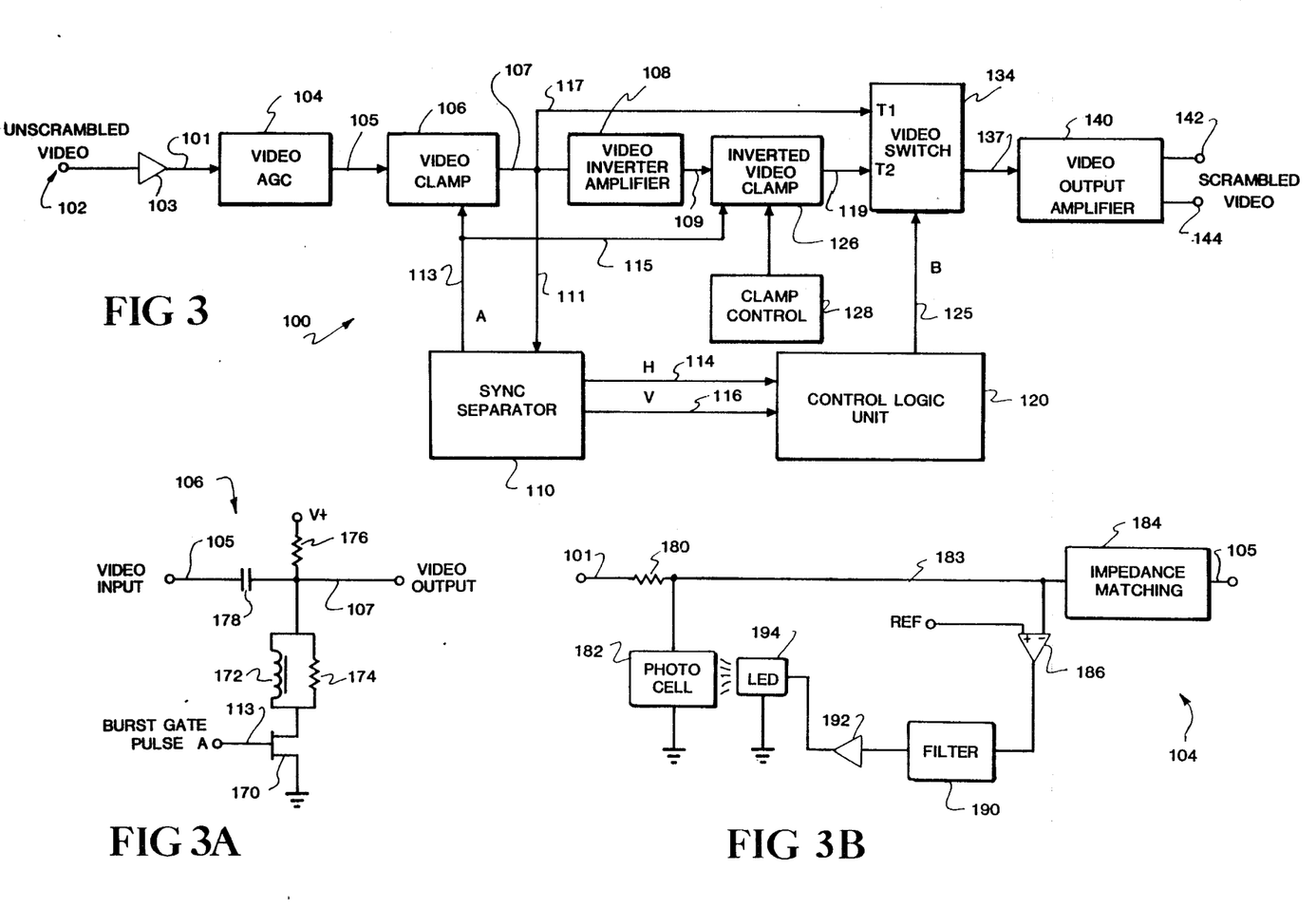
FIG. 3 is a block diagram of encoder circuitry in accordance with a preferred embodiment of the present invention.
FIG. 3A is a circuit diagram of the video clamp circuits used in connection with the encoder circuitry of FIG. 3.

Referring now to FIG. 3, encoder circuitry 100 is shown as a preferred embodiment of the present invention to provide the waveform of FIG. 1B. A video signal input terminal 102 receives an initial unscrambled video signal from a video demodulator, a satellite receiver or some other similar video signal receiving device. The video signal is fed through a conventional video amplifier 103, video automatic gain control unit 104 and video clamp unit 106. This circuitry clamps the horizontal sync pulse amplitude at a fixed level and boosts the entire video signal to a uniform voltage level to enhance processing of the signal by circuitry 100. Preferably the video signal is set at 1.0 volt peak-to-peak. The resultant unscrambled video signal at the output of video clamp 106 corresponds to the unscrambled video signal 10 shown in FIG. 1A.

This standardized video signal is then directed on line 107 to a scrambling circuit comprising a video inverter amplifier 108 which inverts the entire video signal. Inverter amplifier 108 also decreases the amplitude of the inverted video data signals 31 and the inverted horizontal sync pulses 33 to a combined amplitude corresponding to that of the noninverted vertical interval data signals 48. For purposes of this application the term "amplifier" refers to a device which either increases or decreases the amplitude of a signal. The inverted video signal is output from amplifier 108 on line 109 to an inverted video clamp unit 126 controlled by clamp control unit 128.

The standardized video signal 10 is also directed from video clamp 106 on line 111 to a sync separator circuit 110. Sync separator 110 locates and separates the horizontal sync pulses H and vertical sync pulses V and outputs them on lines 114 and 116 respectively to a control logic unit 120. Sync separator 110 also generates a control signal A comprising a plurality of burst gate pulses 56, shown in FIG. 2B, one for each of the video signal lines 0-262. Signal A is fed to video clamp unit 106 on line 113 and to inverted video clamp unit 126 on line 115.

Figure 2B:
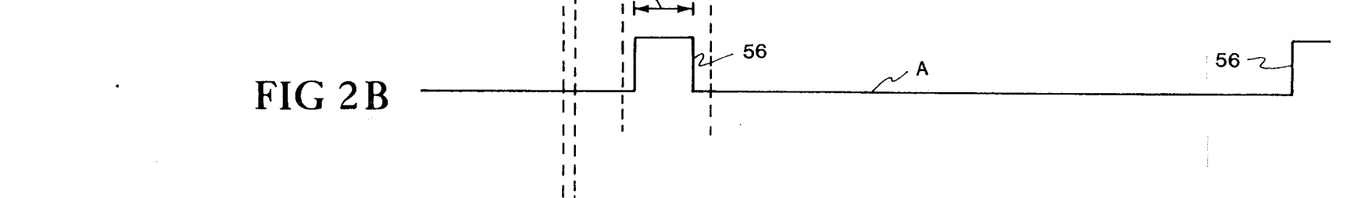
FIGS. 2B and 2C are enlarged illustrations of the control signals shown in FIGS. 1C and 1D.
Figure 2C:
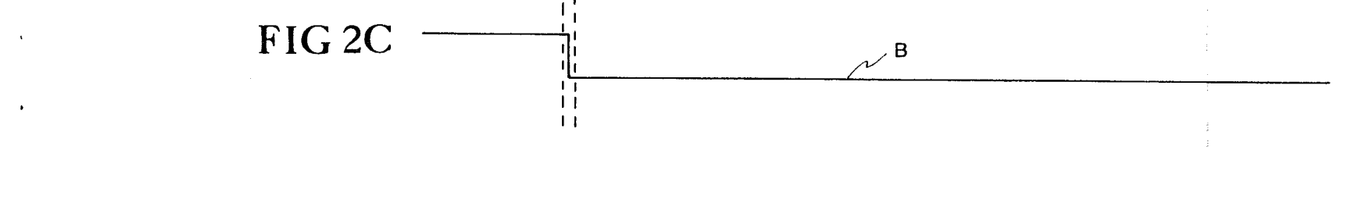

As shown in FIG. 2B, each burst gate pulse 56 is timed to fall within the back porch window 75 and has a pulse width 76 less than that of window 75. Thus, control signal A provides a simple means for encoder circuitry 100 to locate the back porch window 75 and thereby locate the blanking level 73 which is used as the basic reference level in the encoding circuit.

Figure 1D:
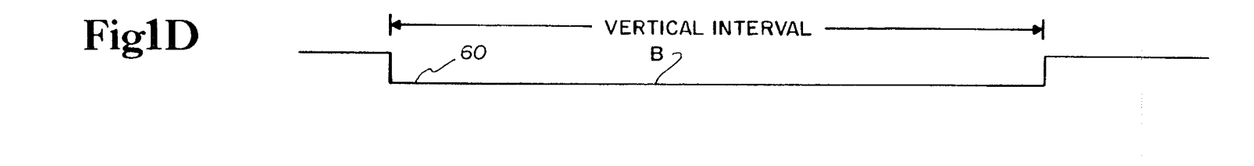

Control logic unit 120 provides a switching signal B corresponding to the signal shown in FIG. 1D. This signal has a single long pulse 60 which is generated at a fixed amplitude for the entire vertical interval 22. Signal B is transmitted on line 125 to an electronic switch 134 to control its switching action.

Referring again to FIG. 3, the inverted video clamp unit 126 and clamp control unit 128 have the function of raising the level of the inverted video signal 20 so that the peaks of the inverted horizontal sync signals 33 as shown in FIG. 1B are at the white reference level 14 and therefore at the same level (100 I.R.E.) as the peak white level of the data signals 48 in vertical interval 22. This is done by clamping onto the blanking level 73 of the inverted signal 20 and raising it to a predetermined new blanking level. Since the video signal has been standardized at a fixed amplitude and the amount of amplitude decrease for the inverted video signal is known, the new blanking level required for inverted horizontal sync tips to reach the white reference level can be calculated. For a 1.0 volt peak-to-peak video signal which is inverted and reduced in amplitude by about 30% the blanking level is preferably raised from zero to about 64.5 I.R.E. so that the new black level 52 shown in FIG. 1B is at 72 I.R.E.

FIG. 3A shows the circuitry of video clamp unit 106, which is substantially identical to the circuitry of inverted video clamp unit 126. Control signal A is input on line 113 to the gate of a field-effect transistor 170 having its source tied to ground. The drain of FET 170 is connected to one end of an AC filter comprising a choke 172 and resistor 174 in parallel. The other end of the AC filter is connected to the video output line 107. The video signal is input on line 105 through a large capacitor 178 to the video output line 107. A voltage V biases output line 107 toward ground. This action charges capacitor 178 to the DC level of the input video signal, which is essentially the zero level or blanking level of the signal. Between burst gate pulses, the leakage of capacitor is negligible. The voltage V+ acting through resistor 176 pulls the output positive to counteract the negative leakage of the capacitor 178.

Clamp control unit 128 is not shown in detail because it is a conventional control circuit for raising the blanking level of the inverted video. Clamp control 128 provides the DC reference voltage for the inverted video signal by means of a conventional voltage regulator and potentiometer.

The inverted video signal from inverted video clamp unit 126 is input on line 119 to a second terminal T2 of electronic switch unit 134. A first terminal T1 receives the standardized unscrambled video signal 10 from node A on line 136. The electronic video switch unit 134 generates an output on output line 137 which alternates between the scrambled inverted video signal on terminal T2 and the unscrambled video signal on terminal T1. The switch enable control signal B shown in FIG. 1D operates the electronic switch to switch the output signal between terminals T1 to T2. The resultant signal on line 137 is fed to a video output amplifier 140 which increases the signal to a desired level prior to being output on video output terminals 142 and 144. The video signal at that point corresponds to the scrambled video signal 50 shown in FIG. 1B.

Referring again to FIG. 2B, the preferred time to initiate the switching control signal B which begins and ends the vertical interval 22 is in time window 74 which occurs during the period of the shoulder 72. At this time the electron gun is shut off and a switch between the scrambled video signal and unscrambled video signal can be performed by electronic switch unit 134 under the control of switching control signal B without generating transient signals in the output.

The video AGC unit 104, although previously known, is disclosed in FIG. 3B in a preferred embodiment. The input signal from amplifier 103 is fed on line 101 through a resistor 180 to a photocell unit 182 is connected in parallel on line 183 with an impedance matching unit 184 which provides the output to video clamp 106. The signal on line 183 is also fed back to the negative input of a comparator 186 having reference voltage REF on the positive input. The output of amplifier is fed back through a filter 190 and amplifier 192 to a light emitting diode 194 directed at photocell 182.

In operation, the signal on 101 is set at a standardized amplitude by altering the resistance of photocell 182. This is done by applying to the comparator 186 in the feedback loop a properly adjusted reference voltage and by filtering and amplifying the feedback signal to power the LED 194. Photocell 182 therefore acts as a variable shunt to ground to control the amplitude of the video signal. Preferably photocell 182 and LED 194 are a single closed photocell module such as the CLM 6000 unit made by Clairex. Impedance matching unit 184 is preferably an emitter follower transistor with appropriate circuit elements.

Figure 4:
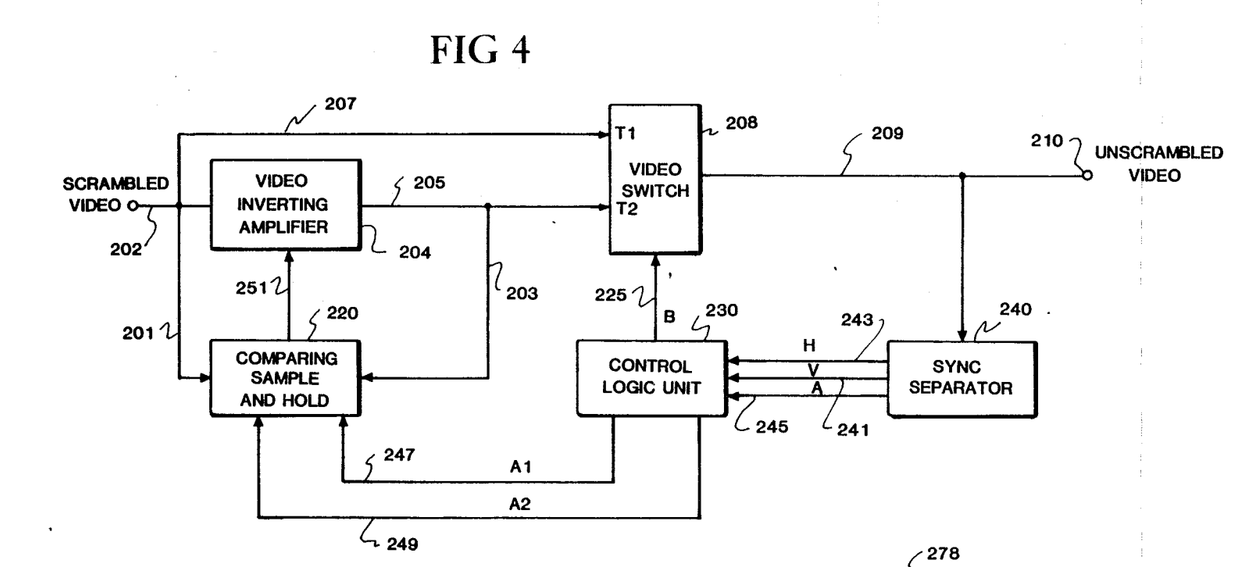
FIG. 4 is a block diagram of video decoder circuitry in accordance with a preferred embodiment of the present invention.

Turning now to FIG. 4, a block diagram is shown for a preferred embodiment of a decoder or descrambler circuitry 200 of the present invention. The descrambler circuitry receives the scrambled video input signal on an input terminal 202 which leads to a video inverting amplifier 204 which is similar to the video inverter amplifier 108 of the encoder circuitry 100. Video inverter amplifier 204 inverts the scrambled video signal and amplifies the amplitude of the signal, preferably by 30 percent or by whatever other amount the signal may have been reduced in the encoder circuitry. The inverted scrambled video signal is then fed by line 205 to a terminal T2 of an electronic video switch unit 208 substantially identical to electronic video switch unit 134 of the encoder circuitry. The scrambled video input also bypasses the video inverting amplifier 204 on line 207 to input on terminal T1 of electronic switch 208. Electronic switch 208 switches between terminals T1 and T2 in response to the vertical interval control signal B on line 225 from control logic 230. The decoded video signal is output on line 209 to the video output terminal 210.

The decoder circuitry 200 must be locked into a proper timing mode with the sync pulses before the decoding process can occur. A sync separator unit 240 is provided to sense the output signal on line 209. This output signal may initially be only the scrambled video signal being received on input terminal 202 and communicated via bypass line 207 and terminal T1 to the output terminal 210. Sync separator 240 generates its own timing signals initially and quickly locks up to the vertical and horizontal sync pulses and delivers those pulses to the control logic unit 230 on lines 241 and 243, respectively. Once the horizontal sync pulses are detected, control signal A comprising a plurality of burst gate pulses 56 is also generated by sync separator 240 and directed on line 245 to control logic unit 230.

The timing and control of video inverting amplifier 204 and electronic switch 208 is carried out by control circuitry 230 having some similarities to the control circuitry of encoder circuit 100. Switching signal B, shown in FIG. 1D, is generated to coordinate decoding with the vertical interval 22 and is input to video switch 208 on line 225. Two additional control signals are derived from control signal A. A viewable video sample enable control signal A1 is generated comprising a plurality of burst gate pulses 56 occurring only during the viewable video portion 20 of the video signal. A vertical interval sample enable control signal A2 is generated comprising a plurality of burst gate pulses 56 occurring only during the vertical interval 22. These signals are input on lines 247 and 249, respectively, to the comparing sample and hold unit 220 for locating the blanking levels of the scrambled and inverted scrambled signals.

The scrambled video input signal on terminal 202 is fed on line 201 to a comparing sample and hold unit 220 which samples the blanking level 73 (FIG. 2A) during the back porch time window 75 of the video signal to determine the timing and amplitude of the blanking level of input scrambled video. Since, in the described preferred embodiment, the vertical interval 22 is unchanged by the encoder circuitry 100, the timing and amplitude of the blanking level 73 is detected during the vertical interval utilizing control signal A2.

Similarly, the inverted scrambled video signal is input on line 203 to comparing sample and hold unit 220. Control signal A1 is used to locate the timing and amplitude of the blanking level of the inverted signal on line 203.

The two blanking levels described above are compared by comparing sample and hold unit 220, and, if necessary, a DC correction voltage is transmitted on line 251 to the video inverting amplifier 204 to bring the blanking level in the video portion of the inverted scrambled signal on line 203 into parity with the blanking level of the vertical interval portion of the input scrambled signal on line 201.

Figure 4A:
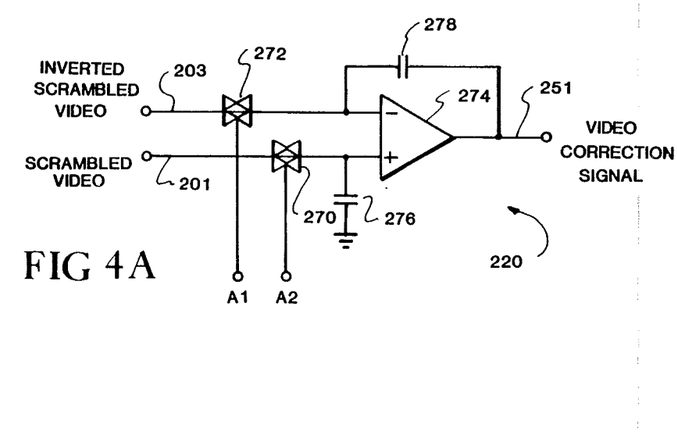
FIG. 4A is a circuit diagram of the comparing sample and hold circuit of the decoder circuitry shown in FIG. 4.

FIG. 4A shows a preferred embodiment of the circuitry of comparing sample and hold unit 220. The scrambled video signal is input on line 201 to an FET switch 270 having an output to the positive terminal of a comparator 274. The inverted scrambled video signal is input from line 203 to an FET switch 272 having an output to the negative terminal of comparator 274. The viewable video sample enable control signal A1 is input to the gate of switch 272, and the vertical interval sample enable control signal A2 is fed to the gate of switch 270. A capacitor 276 is connected between the positive input of comparator 274 and ground. Another capacitor 278 is connected between the negative input and the output of comparator 274.

In operation, the comparing sample and hold unit 220 of FIG. 4A compares the blanking level of the scrambled video signal on its positive input with the blanking level of the inverted scrambled video signal on its negative input and provides a video correction signal on line 251 for video inverting amplifier 204. Control signal A2 allows the scrambled video signal on line 201 to charge capacitor 276 to a DC level representative of the blanking level of that signal. Similarly, control signal A1 switches on electric switch 272 to allow the capacitor 278 to be charged to the blanking level of the inverted scrambled video signal on line 203. These two charges are then compared by comparator 274 in order to provide the video correction voltage on line 251.

The apparatus of FIGS. 3, 3A, 4 and 4A for the encoder and decoder circuitry will now be discussed in further detail. The video inverting amplifiers 108 and 204 of the encoder and decoder circuitry, respectively, are basically conventional amplifier units. Although referred to as amplifiers, the units can be set to increase or decrease the amplitude of the signal as well as invert the polarity of the signal. A conventional unit which is preferably adapted for this use is amplifier model number LM 359 made by National Semiconductor Corporation.

The electronic video switching units 134 and 208 of the encoder and decoder apparatus respectively each preferably comprise a conventional electronic unit with two single switches which operate opposite of each other. A preferable unit for switches 134 and 208 is C-MOS FET circuitry, model number MC 14066, made by Motorola Corporation.

The sync separator unit 110 of the encoder and the sync separator unit 240 of the decoder are also conventional integrated circuitry designed to detect video sync signals on a conventional video input signal and to generate burst gate pulses during the back porch interval. An example of a conventional product for use as units 110 and 240 in the present invention is sync separator unit model number TDA 2591 made by National Semiconductor Corporation. This unit includes a free-running oscillator which generates its own horizontal sync pulses in the absence of sufficient sync pulses on the input signal until it can lock on the vertical and horizontal sync pulses of the video signal. This free-running feature is used primarily by sync separator 240 of the decoder to initially lock onto the horizontal sync pulses of the scrambled signal.

Figure 5:
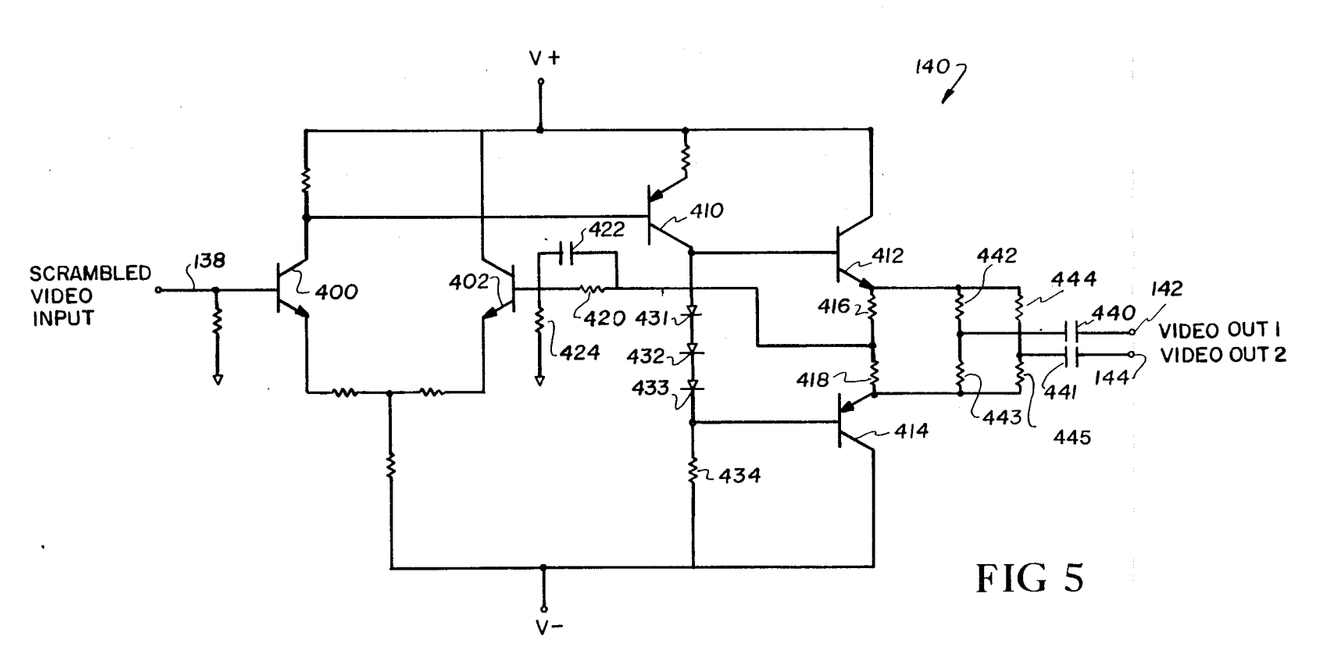
FIG. 5 is a circuit diagram of the video output amplifier in the encoder circuitry of FIG. 3.

Looking next at FIG. 5, the video output amplifier 140 of FIG. 3 is shown in greater detail. Although this amplifier is a rather conventional circuit, it is described herein because of some variations over circuitry available in the marketplace. Video amplifier 140 provides a fixed gain output having two isolated output terminals for separate use. This amplifier pulls the voltage level of the input signal up to an amplitude with a gain of two. The amplifier has a differential input and a push-pull emitter follower output to provide two isolated low impedance output terminals.

Briefly, the video input is fed to a differential circuit comprising two transistors 400 and 402 having their emitters tied together through complimentary series resistors 404 and 406. The node between these two resistors is tied through a third resistor 408 to a negative voltage power supply. The collectors of the transistors 400 and 402 are connected to a positive power supply. The input of base 400 is the scrambled video input from line 137 of FIG. 3.

The output of the differential circuitry is provided by the collector of transistor 400 which is fed to the base of a transistor 410 having its emitter tied to a positive supply voltage and its collector providing an input to the base of a transistor 412. Transistors 412 and another transistor 414 are part of the push-pull emitter follower output circuitry and have their collectors tied respectively to the positive and negative voltage supplies. The emitters of both output transistors connect through series resistors 416 and 418 to a center node 419 providing feedback through a parallel connected resistor 420 and capacitor 422 to the base of feedback transistor 402. A resistor 424 is tied from the base of transistor 402 to ground. Resistors 420 and 424 determine the relative gain of the amplifier. That is, if resistor 420 has a value twice that of resistor 424, the gain of the amplifier 140 is two.

The output of transistor 410 is also connected through three series connected diodes 431, 432, and 433 to the base of transistor 414. This base is connected in turn through a series resistor 434 to the negative voltage supply.

The isolated video output terminals 142 and 144 are each connected through capacitors 440 and 441 to the center points of series resistors 442 and 443 and to the center point of series resistors 444 and 445 respectively. These series resistors are connected in parallel to the emitter outputs of the output transistors 412 and 414.

In operation, the video amplifier 140 receives the input video signal on line 137 connected to the base of transistor 400. The output of that transistor is fed from the collector to the base of transistor 410. Diodes 431, 432 and 433 establish the output current of transistors 412 and 414 by establishing a fixed bias voltage between the bases of those two transistors. Preferably this bias voltage is between 1.8 and 2.1 volts. The output signals from transistors 412 and 414 are separately processed in parallel through resistive isolation networks to provide separate independent video outputs. The feedback from node 419 through the gain circuitry 420, 422, and 424 to transistor 402 substantially reduces the gain which would otherwise be obtained by amplifier 140 to a level which is acceptable at the video outputs 142 and 144. Thus, the differential circuitry effectively subtracts the difference between the input signal and the feedback signal to achieve the desired gain.

In the preferred embodiment of FIG. 5, the output resistors 442, 443, 444, and 445 are each set at 150 ohms so that the output impedance of each terminal 142 and 144 is fixed at 75 ohms. The output voltage of each signal at the output terminals 142, 144 is preferably one volt peak to peak. Thus, the gain for each terminal is essentially one because the gain of two is divided in half by the two parallel output terminals. The purpose of the video output amplifier 140 therefore is to provide a fixed video output level substantially at the level of the video input on each of two isolated output terminals having low impedance.

Figure 6:
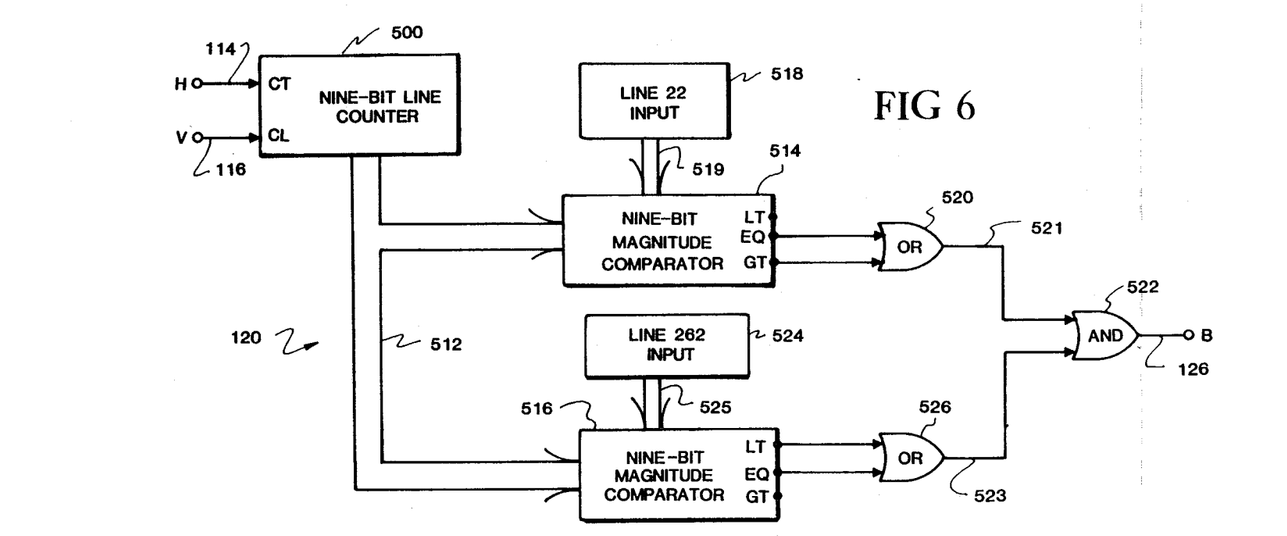
FIG. 6 is a block diagram of the control logic unit of the encoder circuitry shown in FIG. 3.
Figure 7:
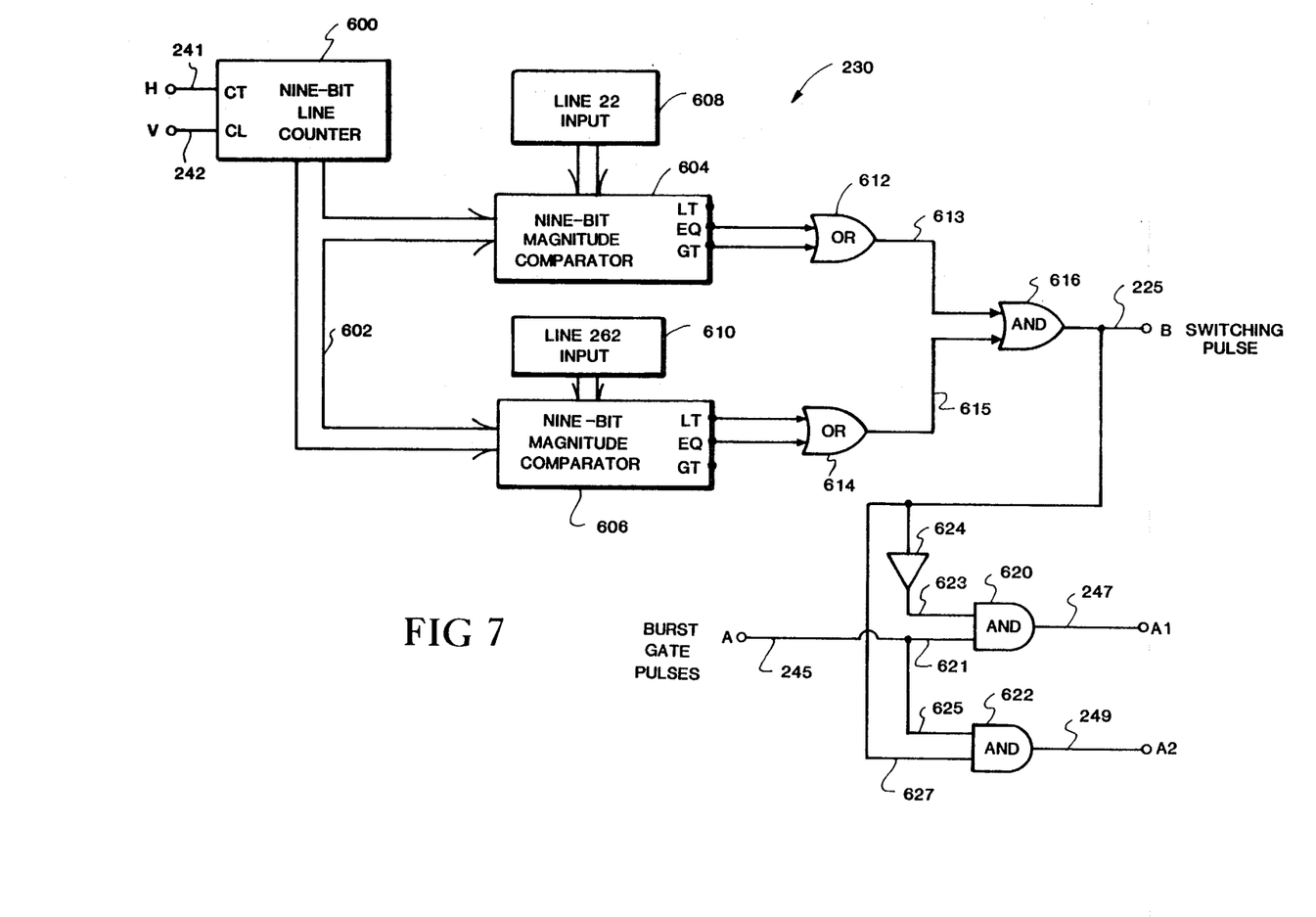
FIG. 7 is a block diagram of the control logic unit of the decoder circuitry shown in FIG. 4.

The control logic unit 120 of the encoder circuitry and control logic unit 230 of the decoder circuitry, are shown in FIGS. 6 and 7. The units are basically timing circuits which utilize the timing of the horizontal and vertical sync pulses and the burst gate pulses as inputs to generate one or more output enable signals to actuate other circuitry in the encoder and decoder.

Control logic unit 120 of the encoder circuit, shown in FIG. 6, is designed to output vertical interval switching signal B on line 125 to video switch 134 for determining the portion of the video signal to be scrambled. Control circuitry 120 includes a conventional nine-bit line counter 500 for counting video lines. Horizontal sync pulses 32 are input on line 114 to a "count" terminal CT of line counter 500, and vertical sync pulses 42 are input on line 116 to a "clear" terminal CL of line counter 500. The horizontal sync pulses cause line counter 500 to advance one count for each video line. The line counter 500 is reset each time a vertical sync pulse 42 is received on line 502.

The output of line counter 500 is transmitted in parallel as a nine-bit line count on parallel line 512 to two conventional, nine-bit magnitude comparators 514 and 516. Comparator 514 has a "line 22" parallel input circuit 518 on parallel line 519. Comparator 514 outputs from its "EQ" (equal) and "GT" (greater than) terminals in parallel to an OR gate 520 the output of which is fed to one input of AND gate 522.

Similarly, the nine-bit line count parallel line 512 is fed to nine-bit magnitude comparator 516 having a separate "line 262" input circuit 524 on line 525. Comparator 516 has an output on its "LT" (less than) and its "EQ" (equal) terminals in parallel to OR gate 526, having an output 523 directed to the other input of AND gate 522. An output is provided on line 126 from AND gate 522 in the form of switching signal B only during the vertical interval between lines 22 and 262.

Figure 6A:
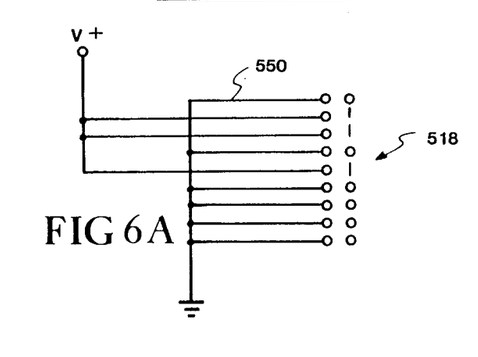
FIG. 6A is a circuit diagram of the "line 22" nine-bit circuit of FIG. 6.

Referring to FIG. 6A the circuitry of line 22 input circuit 518 is shown. This circuit is simply a plurality of hardwired parallel lines have a connection either to a positive voltage V+ or to ground to form an equivalent binary number. The circut 518 shows the wire 550 representing the least significant bit wired to ground, the second, third and fifth bit wires connected to the positive voltage V+ and the remaining wires connected to ground. This arrangement forms the binary numbers 000010110 which is equivalent to decimal 22. Line 262 input circuit 524 is similarly constructed and is not shown here.

Looking now at FIG. 7, the circuitry for control logic unit 230 of the decoder circuitry shown in FIG. 4 is given in greater detail. The horizontal sync pulses 32 are input on line 241 to the "count" terminal CT of a conventional nine-bit line counter unit 600. The vertical sync pulses 42 are input on line 242 to the "clear" terminal CL of counter unit 600. As in the encoder control circuitry, counter unit 600 outputs a parallel nine-bit line count on parallel line 602 to two nine-bit magnitude comparators 604 and 606. Comparator 604 has a "line 22" input circuit 608 signaling the end of the vertical interval, and comparator 606 has a "line 262" input circuit 610 signaling the beginning of the vertical interval. Comparator 604 feeds from its "EQ" and "GT" terminals through OR gate 612 to an input 613 of AND gate 616. Comparator 606 feeds from its "LT" and "EQ" output terminals to OR gate 614 having an output as the other input 615 of AND gate 616. The output of AND gate 616 is switching signal B which is directed on line 225 to the video switch 208, as shown in FIG. 4.

It will be remembered from the discussion of FIG. 4 that the sync separator unit 240 provides a control signal A comprising burst gate pulses 56 and line 245 for control logic unit 230. As shown in FIG. 7, the burst gate pulses on line 245 are input to AND gates 620 and 622 on lines 621 and 625. The other input 627 of AND gate 622 comes from the output of AND gate 616, which is also inverted by inverter 624 and fed to the other input 623 of AND gate 620. The output of AND gate 620 is fed to line 247 as the viewable video sample enable signal A1 so that the comparing sample and hold unit 220 shown in FIG. 4 can sample the blanking level during the viewable video portion of the video signal. The output of AND gate 622 is provided on line 249 as the vertical interval sample enable signal A2 so that the comparing sample and hold unit 220 shown in FIG. 4 can sample the blanking level during the vertical interval portion of the video signal.

It should be understood that the present invention also includes other preferred embodiments wherein the scrambled video signal includes unscrambled parts of the video portion of the signal and scrambled parts of the vertical interval portion of the signal. Thus, the encoder circuitry may be programmed to output the switching control signal B to the electronic switch at a time different than the beginning and end of the vertical interval. A simple read-only memory (ROM) can be used for this purpose, as part of the control logic unit 120. In this case, similar circuitry is required for the control logic unit 230 of the decoder circuitry in order to enable and disable the control switching signal B of the decoder circuitry at the appropriate time. Preferably each control logic unit in said embodiment includes a set of dividers having gates at their outputs and a ROM unit in communication therewith to program the gates for switching at a predetermined count on the video signal lines.

Another preferred embodiment provides for random switching of the electronic switch 134 of encoder circuitry 100 so that the scrambled and unscrambled portions of the video signal are randomly varied for each video line. In this case, additional data must be transmitted as part of each video line in order for the decoder circuitry to determine the switching point for each line. The data information is preferably transmitted on video signal lines 17 and 18 which are normally available for control data. In this preferred embodiment, the control logic unit of the encoder preferably includes a conventional data inserter unit having a timing unit therein for placing the required data on the designated lines in the video signal output. Similarly, the control logic unit of the decoder circuitry for this preferred embodiment utilizing a random switching approach requires a conventional data stripper microprocessor to remove the transmitted data in the designated lines (preferably lines 17 and 18) of the video signal so that the control logic unit timing for the output switching signal B can be set for each video line.

Although the foregoing preferred embodiments have been described in detail, it should be understood that the present invention includes other obvious modifications besides the embodiments shown herein. For example, the horizontal sync pulses of certain portions of the video signal might be inverted while leaving the video data signals in a normal uninverted position. Other similar modifications may be made wherein other portions of the video signal might be only partially inverted. The important feature in all preferred embodiments is that at least a portion of the horizontal sync pulses be inverted and preferably reduced in amplitude so as to be essentially undetectable by an unauthorized television receiver, while leaving a substantial portion of the vertical interval pulses, particularly the vertical interval sync pulse, unchanged without inversion or a modification of amplitude. This approach enables the use of a relatively simple and economical circuitry for the encoder and decoder units while providing a video signal which is effectively scrambled and cannot be decoded without prope decoding circuitry as described herein.

What is claimed is:

1. A video encoder system for processing a video signal on an input terminal having alternate video portions and vertical interval portions, each video portion including video data and horizontal sync pulses, to provide a scrambled video signal on an output terminal, comprising:

first encoder means for inverting a plurality of the horizontal sync pulses in a first section of said video signal, said first section including at least part of the video portion and excluding at least part of the vertical interval portion;

second encoder means for reducing the amplitude of each said inverted horizontal sync pulses in said first section; and scrambling means for generating a scrambled video signal having said first section of said video signal which has been processed by said first and second encoder means and a second section of said video signal, being that portion of the video signal which has not been processed by said first and second encoder means.

2. The system of claim 1 wherein said first encoder means includes inverter means for inverting the video portions of the video signal, excluding the vertical interval portions of the video signal.

3. The system of claim 1 wherein said second encoder means includes amplifying means for reducing the amplitude of the first section of the video signal, including the video and vertical interval portions thereof.

4. The system of claim 1 wherein said scrambling means comprises switching means in communication with said first and second encoder means and with said input terminal for alternately passing to said output terminal said first section of said video signal which has been processed by said first and second encoder means and said second section of said video signal from said input terminal.

5. The system of claim 1 and further comprising adjusting means in communication with said first and second encoder means for moving the DC level of said first section of the video signal relative to the DC level of the second section of the video signal to further scramble the video signal and to minimize the power output requirements of the video encoder system.

6. The system of claim 1 wherein the second section of the video signal not processed by said first and second encoder means comprises at least a part of the vertical sync pulse and a plurality of horizontal sync pulses.

7. A video encoder system for processing an initial video signal having alternate video portions and vertical interval portions, each video portion including video data and horizontal sync pulses, and each vertical interval portion including a vertical sync pulse, vertical interval dalta, and horizontal sync pulses to provide a scrambled video signal comprising:

first encoder means for inverting each at least a part of said video portion;

second encoder means for modifying the amplitude of each said video portion including the video data and the horizontal sync pulses;

scrambling means for alternately outputting video portions of a modified video signal which have been processed by said first and second encoder means and vertical interval portions of said initial video signal to provide said scrambled video signal; and timing means for detecting the horizontal and vertical sync pulses of said initial video signal and for controlling said scrambling means to provide said scrambled video signal.

8. The encoder system of claim 7 wherein said first encoder means comprises video inverter means for inverting the entire video portion including the video data and the horizontal sync pulses.

9. The encoder system of claim 7 wherein said second encoder means comprises means for substantially reducing the amplitude of the video portion of the video signal.

10. The encoder system of claim 7 wherein said scrambling means comprises first input means for receiving a modified video signal which has been processed by said first and second encoder means, second input means for receiving the initial video signal, and switch means for alternately outputting a video portion of the modified video signal and a vertical interval portion of the initial video signal.

11. The encoder system of claim 10 wherein the timing means comprises a control logic circuit responsive to said vertical and horizontal sync pulses to output a timing pulse to enable the switch means.

12. A video decoder system for processing a scrambled video signal having an inverted portion including inverted horizontal sync pulses, and a noninverted portion including at least a part of the vertical interval, to provide an unscrambled video signal, the inverted video portion having an amplitude different than the amplitude of the noninverted portion comprising:
   first decoder means for re-inverting said inverted portion of said scrambled video signal;
   second decoder means for modifying the amplitude of the reinverted portion of said scrambled video signal to correspond to the amplitude of the noninverted portion; and
   combining means for generating said unscrambled video signal by alternately outputting the re-inverted portion which has been processed by said first and second decoder means and the noninverted portion of the scrambled video signal.

13. The decoder system of claim 12 wherein said inverted portion includes inverted video data and inverted horizontal sync pulses and wherein the noninverted portion includes the vertical interval of the video signal.

14. The decoder system of claim 12 wherein said second decoder means comprises means for substantially reducing the reinverted portion of the scrambled video signal.

15. The decoder system of claim 12 wherein said combining means comprises first input means for receiving the re-inverted portion which has been processed by said first and second decoder means, second input means for receiving the noninverted portion, and switch means for alternately outputting the re-inverted portion and the noninverted portion of the scrambled video signal.

16. The decoder circuit of claim 15 wherein said timing means comprises control logic means responsive to the vertical and horizontal sync pulses of the unscrambled video signal to generate a timing pulse to enable the switch means.

17. The decoder circuit of claim 12 wherein the noninverted portion includes a vertical sync pulse and a plurality of horizontal sync pulses, and further comprising timing means for detecting the horizontal and vertical sync pulses of said unscrambled video signal and for controlling the combining means to alternately output said reinverted portions and said noninverted portions.

18. The decoder circuit of claim 12 wherein the DC level of the inverted portion of the video signal has been offset relative to the noninverted portion, and wherein the DC level of the re-inverted portion is aligned with the DC level of the noninverted portion.

19. A video encoder system for processing a video signal on an input terminal having alternate video portions and vertical interval portions, each video portion including video data and horizontal sync pulses, and each vertical interval portion including a vertical sync pulse, vertical interval data, and horizontal sync pulses to provide a scrambled video signal on an output terminal, comprising:
   inverting amplifier means in communication with said input terminal for inverting the video signal and for reducing the amplitude of the input video signal to generate an inverted video signal;
   switching means in communication with said inverting amplifier means and said input terminal for alternately passing to the output terminal at least a part of the vertical sync pulse and a plurality of the horizontal sync pulses in the vertical interval portion of the input video signal and at least a part of the video portion of the inverted video signal to generate a scrambled video signal;
   detection means in communication with said input terminal for detecting and transmitting the horizontal and vertical sync pulses of the vertical interval portion; and
   control means in communication with said detection means and said switching means for generating a control signal for the switching means to generate said scrambled video signal in response to the horizontal and vertical sync pulses transmitted by the detection means to the control means.

20. The video encoder system of claim 19 and further comprising reference detecting means in communication with said inverting amplifier means for detecting a DC reference level of the input video signal and a corresponding DC reference level of the inverted video signal, and adjusting means for shifting the corresponding reference level of the inverted video signal relative to the reference level of the input video signal.

21. The encoder system of claim 20 wherein said reference detecting means includes first means for detecting the blanking level of the input video signal and second means for detecting the blanking level of the inverted video signal.

22. The encoder system of claim 21 wherein the adjusting means comprises control means in communication with said second means for generating a control signal to adjust the DC level of the inverted video signal so that the peaks of the horizontal sync pulses of the inverted video signal are substantially at the white reference level of the input video signal.

23. A video decoder system for processing a scrambled video signal on an input terminal, said scrambled video signal having an encoded section including inverted horizontal sync pulses and inverted video data, and a nonencoded section including at least a part of a vertical interval pulse and a plurality of horizontal sync pulses, to provide an unscrambled video signal on an output terminal, comprising:
   inverting means in communication with said input terminal for inverting the scrambled video signal to generate an inverted video signal;
   Amplifier means for increasing the amplitude of the encoded section of the inverted video signal to generate a decoded section of said inverted video section;

switching means in communication with the amplifier means and with the input terminal for alternately passing to the output terminal the nonencoded section of the scrambled video signal from the input terminal and the decoded section of the inverted video signal from the inverting means, to generate said unscrambled signal;

detection means in communication with said output terminal for detecting and transmitting at least a part of the vertical interval pulse and the plurality of horizontal sync pulses in said nonencoded section; and control means in communication with said detection means and said switching means for generating a control signal for the switching means to provide said unscrambled video signal in response to at least a part of the vertical interval pulse and the plurality of horizontal sync pulses transmitted by said detection means to the control means.

24. The video decoder system of claim 23 and further comprising amplifier means for increasing the amplitude of the encoded section of the inverted video signal to correspond with the amplitude of the nonencoded section of the scrambled video signal.

25. The video decoder system of claim 24 and further comprising comparator means for detecting a DC reference level of the input scrambled video signal and a corresponding DC reference level of the inverted video signal, and adjusting means for shifting the corresponding DC reference level of the inverted video signal to substantially align it with the DC reference level of the input scrambled video signal.

26. A method of encoding a video signal having alternate video portions and vertical interval portions, each video portion including video data and horizontal sync pulses, and each vertical interval portion including a vertical sync pulse and horizontal sync pulses, to provide a scrambled video signal, comprising:

inverting a plurality of the horizontal sync pulses in a first section of said video signal, said first section including at least part of the video portion and excluding at least part of the vertical interval portion;

reducing the amplitude of said inverted horizontal sync pulses in said first section; and generating a scrambled video signal comprising, alternately, said first section of said video signal which has been inverted and reduced and a second section of said video signal comprising that portion of the video signal which has not been inverted and reduced.

27. The method of claim 26 wherein second section of said video signal includes at least part of the vertical sync pulse and a plurality of horizontal sync pulses.

28. The method of claim 26 wherein the DC level of the first section is shifted relative to the DC level of the second section of the video signal.

29. A method of decoding a scrambled video signal having an inverted portion including inverted horizontal sync pulses, and a noninverted portion including at least a part of the vertical interval, the inverted portion having an amplitude different than the amplitude of the noninverted portion, to provide an unscrambled video signal, comprising:

inverting said inverted portion of said scrambled video signal to generate a re-inverted portion;

modifying the amplitude of the re-inverted video portion of said scrambled video signal to correspond to the amplitude of the noninverted portion; and generating an unscrambled video signal comprising, alternately, said modified re-inverted portions and said noninverted vertical interval portions of the scrambled video signal.

30. The method of claim 29 wherein said noninverted vertical interval portion includes at least a part of a vertical sync pulse and a plurality of horizontal sync pulses, and further comprising the step of detecting the horizontal and vertical sync pulses of said scrambled video signal to determine the timing for generating said unscrambled video signal.

31. A method of encoding a normalized video signal having periodic video fields, each field having a first DC voltage reference level, comprising:

inverting a portion of each field of the video signal to provide an inverted portion and a noninverted portion of the video signal, reducing the amplitude of said inverted portion of the video signal by a first predetermined amount;

determining the first DC voltage reference levels of said inverted portion and said non-inverted portion; and shifting the inverted portion relative to the noninverted portion so that the first DC reference level of the inverted portion is offset by a second predetermined amount from the first DC reference level of the noninverted portion of the video signal.

32. The method of claim 31 wherein each field of the video signal comprises a video information section and a vertical interval section and wherein said inverted portion of the video signal comprises at least part of the video information section and excludes at least part of the vertical interval section.

33. The method of claim 32 wherein said inverted portion of the video signal comprises all of the video information section and wherein said noninverted portion of the video signal comprises all of the vertical interval section.

34. The method of claim 31 wherein each field has a second DC voltage reference level and wherein the inverted portion is shifted to lie substantially between the first and second reference levels of the noninverted portion.

35. The method of claim 31 wherein the inverted second reference level of said inverted portion is substantially aligned with the first reference level of the noninverted portion.

36. The method of claim 31 wherein each field of the video signal includes a plurality of horizontal sync pulses and wherein the tips of the inverted horizontal sync pulses of the inverted portion are substantially aligned with second reference level of the noninverted portion.

37. The method of claim 31 wherein the first DC voltage reference level of the video signal is the blanking level.

38. The method of claim 31 wherein the DC voltage second reference level of the video signal is the white level.

39. A method of encoding a normalized video signal having periodic video fields with video information sections and vertical interval sections, each field having a blanking level, a white level and a horizontal sync tip level, comprising:

inverting the video information section of each field to generate an inverted portion and non-inverted portion of the video signal;

reducing the amplitude of said inverted portion of the video signal by a first predetermined amount;

sensing the blanking levels of the inverted portion and the noninverted portion; and shifting the blanking level of the inverted portion relative to the blanking level of the noninverted portion by a second predetermined amount.

40. The method of encoding of claim 39 wherein the second predetermined amount of shifting substantially aligns the inverted horizontal sync tip level of the inverted portion with the white level of the noninverted portion.

41. The method of encoding of claim 39 wherein the second predetermined amount of shifting substantially aligns the inverted white level of the inverted portion with the blanking level of the noninverted portion.

42. A video encoding system for encoding a normalized video signal having periodic video fields, each field having a first DC voltage reference level, comprising:

first encoding means for inverting aportion of each field of the video signal to provide an inverted portion and a noninverted portion of the video signal, second encoding means for reducing the amplitude of said inverted portion of the video signal by a first predetermined amount;

means for determining the first DC voltage reference levels of said inverted portion and said noninverted portion; and control means for shifting the inverted portion relative to the noninverted portion so that the first DC reference level of the inverted portion is offset by a second predetermined amount from the first DC reference level of the noninverted portion of the video signal.

43. The encoding system of claim 42 wherein each field of the video signal comprises a video information section and a vertical interval section and wherein said inverted portion of the video signal comprises at least part of the video information section and excludes at least part of the vertical interval section.

44. The system of claim 43 wherein said inverted portion of the video signal comprises all of the video information section and wherein said noninverted portion of the video signal comprises all of the vertical interval section.

45. The system of claim 42 and further comprising second determining means for determining a second DC voltage reference of said inverted portion and said noninverted portion, and wherein said control means shifts the inverted portion to lie substantially between the first and second reference levels of the noninverted portion.

46. The system of claim 42 wherein the inverted second reference level of said inverted portion is substantially aligned with the first reference level of the noninverted portion.

47. The system of claim 42 wherein each field of the video signal includes a plurality of horizontal sync pulses and further comprising third determining means for determining the tips of the inverted horizontal sync pulses and wherein said control means shifts the inverted portion so that the tips of the inverted horizontal sync pulses of the inverted portion are substantially aligned with second reference level of the noninverted portion.

48. The system of claim 42 wherein the first DC voltage reference level of the video signal is the blanking level.

49. The system of claim 42 wherein the second DC voltage reference level of the video signal is the white level.

50. A method of decoding a normalized scrambled video signal having periodic video fields, each field having an inverted portion and a noninverted portion with an amplitude greater than the inverted portion and a first DC voltage reference level relative to each of the inverted and noninverted portions, comprising inverting said inverted portion of the scrambled video signal to generate a re-inverted portion;

increasing the amplitude of the re-inverted portion to correspond to the amplitude of the noninverted portion of the scrambled video signal;

determining the first DC voltage reference levels of the reinverted portion and the noninverted portion; and shifting the re-inverted portion relative to the noninverted portion by a predetermined amount so that the DC reference levels of the re-inverted portion and noninverted portion are substantially aligned.

51. The decoding method of claim 50 wherein said first DC voltage reference level is the blanking level.

52. A video decoding system for decoding a normalized scrambled video signal having periodic video fields, each field having an inverted portion and a noninverted portion with an amplitude greater than the inverted portion and a first DC voltage reference level relative to each of the inverted and noninverted portions, comprising first decoding means for inverting said inverted portion of the scrambled video signal to generate a re-inverted portion;

second decoding means for increasing the amplitude of the reinverted portion to correspond to the amplitude of the noninverted portion of the scrambled video signal;

means for determining the first DC voltage reference levels of the re-inverted portion and the noninverted portion; and control means for shifting the re-inverted portion relative to the noninverted portion by a predetermined amount so that the DC reference levels of the re-inverted portion and noninverter portion are substantially aligned.

53. The video decoding system of claim 52 wherein said first DC voltage reference level is the blanking level.

* * * * *